United States Patent
Lowet et al.

(10) Patent No.: US 12,357,128 B2
(45) Date of Patent: Jul. 15, 2025

(54) FOOD PROCESSING DEVICE AND RECIPE GUIDANCE METHODS

(71) Applicant: KONINKLIJKE PHILIPS N.V., Eindhoven (NL)

(72) Inventors: Dietwig Jos Clement Lowet, Eindhoven (NL); Jan Martijn Krans, Eindhoven (NL); Illapha Gustav Lars Cuba Gyllensten, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 819 days.

(21) Appl. No.: 17/609,394

(22) PCT Filed: Apr. 20, 2020

(86) PCT No.: PCT/EP2020/060941
§ 371 (c)(1),
(2) Date: Nov. 7, 2021

(87) PCT Pub. No.: WO2020/224939
PCT Pub. Date: Nov. 12, 2020

(65) Prior Publication Data
US 2022/0183505 A1 Jun. 16, 2022

(30) Foreign Application Priority Data
May 6, 2019 (EP) ..................... 19172770

(51) Int. Cl.
*A47J 43/07* (2006.01)
*A47J 36/32* (2006.01)
(Continued)

(52) U.S. Cl.
CPC ......... *A47J 43/0716* (2013.01); *A47J 36/321* (2018.08); *G01G 19/52* (2013.01);
(Continued)

(58) Field of Classification Search
CPC . A47J 43/0716; A47J 43/07; A47J 2043/0733
See application file for complete search history.

(56) References Cited

U.S. PATENT DOCUMENTS 9,854,945 B2 * 1/2018 Starflinger .......... A47J 43/0777
2011/0032362 A1 2/2011 Hall
(Continued)

FOREIGN PATENT DOCUMENTS

CN 105640367 A 6/2016
CN 105832342 A 8/2016
(Continued)

OTHER PUBLICATIONS

Espacenet translation of Post, H. (WO2018069253A1), published Apr. 19, 2018 (Year: 2018).*
(Continued)

*Primary Examiner* — Elizabeth Insler
(74) *Attorney, Agent, or Firm* — Maschoff Brennan

(57) ABSTRACT

A food processing device adapted to identify an ingredient and an associated recipe. The device includes a container for receiving an ingredient to be processed and a blending blade located in the container. The device further includes a sensor for sensing characteristics of the ingredient received at the container, a processor for analyzing the characteristics, and a communications system for sending the characteristics to a remote data processing resource for analyzing or further analyzing, where the analyzing is for identifying ingredient types for a plurality of added ingredients and for identifying a recipe consistent with the added ingredient types. The device further includes an output device for guiding a user to follow remainder of the identified recipe.

16 Claims, 5 Drawing Sheets

(51) Int. Cl.
  *G01G 19/52*  (2006.01)
  *G01L 5/00*  (2006.01)
  *G01N 27/02*  (2006.01)

(52) U.S. Cl.
  CPC ............... *G01L 5/00* (2013.01); *G01N 27/02* (2013.01); *A47J 2043/0733* (2013.01)

(56) References Cited

U.S. PATENT DOCUMENTS

| | | | |
|---|---|---|---|
| 2016/0120370 A1 | 5/2016 | Starflinger | |
| 2016/0241653 A1 | 8/2016 | Ciepiel | |
| 2018/0116467 A1* | 5/2018 | Ciepiel | A47J 43/07 |
| 2018/0140196 A1 | 5/2018 | Khosravi Simchi et al. | |
| 2019/0110638 A1 | 4/2019 | Li et al. | |
| 2019/0254481 A1* | 8/2019 | Frielinghaus | B01F 35/2117 |

FOREIGN PATENT DOCUMENTS

| | | | | |
|---|---|---|---|---|
| DE | 102016219972 A1 | | 4/2018 | |
| JP | 2012-032193 A | | 2/2012 | |
| WO | WO-2018069253 A1 | * | 4/2018 | ............ A47J 36/321 |
| WO | 2019012145 A1 | | 1/2019 | |

OTHER PUBLICATIONS

Kranz, M., et al., "Sensing Technologies and the Player-Middleware for Context-Awareness in Kitchen Environments", Fourth International Conference on Networked Sensing Systems, pp. 1-8, Jul. 2007.

Kojima, T., et al., "Cogknife: Food Recognition From Their Cutting Sounds", IEEE International Conference on Multimedia & Expo Workshops (ICMEW), vol. 1, pp. 1-6, 2016.

"Meet your personal nutrition coach from your kitchen counter—the Philips High Speed Connected Blender", Retrieved from the Internet URL: https://www.philips.com/a-w/about/news/archive/standard/news/press/2018/21080830-meet-your-personal-nutrition-coach-from-your-kitchen-counter-the-philips-high-speed-connected-blender.html, pp. 1-8, Aug. 30, 2018.

Extended European Search Report issued in connection with corresponding EP Application No. 19172770.0 dated Nov. 14, 2019.

International Search Report and Written Opinion issued in connection with corresponding PCT Application No. PCT/EP2020/060941 dated Jul. 15, 2020.

"Weighing scale", Wikipedia, Retrieved from the Internet URL: https://en.wikipedia.org/wiki/Weighing_scale, pp. 1-13, Oct. 30, 2021.

* cited by examiner

FOOD PROCESSING DEVICE AND RECIPE GUIDANCE METHODS

CROSS-REFERENCE TO RELATED APPLICATIONS

The present application is a U.S. National Phase application under 35 U.S.C. § 371 of International Application No. PCT/EP2020/060941, filed on Apr. 20, 2020, which claims the benefit of European Patent Application No. 19172770.0, filed on May 6, 2019. The application is hereby incorporated by reference herein.

FIELD OF THE INVENTION

The invention relates to the field of food processing devices, and more specifically to the field of smart food processing devices.

BACKGROUND OF THE INVENTION

Food processing devices, such as blenders, are common in most households. In order to prepare the food in a desirable and consistent manner using the device, a user will often follow a recipe.

Recipes are traditionally collated into a recipe book; however, it is now commonplace to access a given recipe via the internet when it is needed. The drawback of accessing recipes as they are needed is that it may be difficult to relocate a recipe for subsequent uses. This can lead to partially remembered recipes being followed by the user, which may result in suboptimal and disappointing food preparations.

Further, some recipes may require certain steps to be followed in a specific order to achieve the desired results, which may not be known or appreciated by an inexperienced user.

There is therefore a need for a more user friendly food processing device.

SUMMARY OF THE INVENTION

The invention is defined by the claims.

According to examples in accordance with an aspect of the invention, there is provided a food processing device, comprising:
  a container for receiving an ingredient to be processed;
  a blending blade located in the container;
  a sensor for sensing characteristics of the ingredient received at the container;
  a processor for analyzing the characteristics and/or a communications system for sending the characteristics to a remote data processing resource for analyzing or further analyzing, wherein the analyzing is for identifying ingredient types for a plurality of added ingredients and for identifying a recipe consistent with the added ingredient types; and
  an output device for guiding a user to follow the remainder of the identified recipe.

The device provides for the automatic recognition of an ingredient added to the container of a food processing device.

The automatic recognition of the most recently added ingredient may then be used to guide a user to follow a given recipe.

In an embodiment, the sensor comprises a weight sensor and wherein the characteristics of the ingredient comprise a response curve generated by the weight sensor.

The response curve generated when the ingredient is added to the container, such as when the ingredient impacts the base of the container, may provide information relating to the type of ingredient added to the container.

In an embodiment, the sensor comprises a camera and wherein the characteristic of the ingredient comprise a visual ingredient indicator generated by the camera.

A camera may be used to help identify the ingredient, for example by including image recognition capabilities in the analysis performed by the processor.

In a further embodiment, the device further comprises a base unit adapted to be removably coupled to the container and the camera is located within the base unit, and wherein the device comprises a light guide adapted to direct light from an upper portion of the container to the camera.

In this way, the most recently added ingredient may be visible to the camera. The light guide may, for example, be built into a handle of the container.

In a further embodiment, the container comprises a handle, and wherein at least a portion of the light guide is located within the handle.

In this way, the light guide may be at least partially housed within a structure having an additional functionality.

In an embodiment, the sensor comprises one or more of:
  a microphone, wherein the characteristics of the ingredient comprise an audio signal of the ingredient being received in the container;
  a torque sensor coupled to the blending blade, wherein the characteristics of the ingredient comprise a blending resistance;
  an electrical measurement sensor, wherein the characteristics of the ingredient comprise an ingredient impedance;
  a temperature sensor, wherein the characteristics of the ingredient comprise a temperature of the ingredient; and
  a gas sensor, wherein the characteristics of the ingredient comprise a gas composition of air within the container.

In this way, additional ingredient characteristics may be accounted for when identifying the ingredient.

In an embodiment, the communications system is adapted to be in communication with a smart device of a user.

In this way, the user may interact with the food processing device in a convenient manner without requiring additional user interaction capabilities to be built into the food processing device itself.

In an embodiment, the processor is adapted to apply a machine learning algorithm to the characteristics of the ingredient for analyzing said characteristics of the ingredient.

In this way, the capacity for the food processing device to recognize ingredients and associated recipes may develop and improve with use.

According to examples in accordance with an aspect of the invention, there is provided a system for guiding a user according to a recipe identified based on an identified ingredient, the system comprising
  one or more food processing devices as described above;
  a remote data processing resource coupled to the food processing device by way of the communications system, the remote data processing resource comprising a collaborative machine learning algorithm, and wherein the system is adapted to:

update the machine learning algorithm of the one or more food processing devices based on the collaborative machine learning algorithm; and upload analyzed characteristics of the ingredient from the one or more food processing devices to the remote data processing resource for use in the collaborative machine learning algorithm.

In this way, the machine learning algorithm may be trained and updated using a central server which any number of devices may communicate with, thereby increasing the dataset for training the machine learning algorithm.

According to examples in accordance with an aspect of the invention, there is provided a recipe guiding method comprising:

sensing characteristics of an ingredient when the ingredient is received in a container;

analyzing the characteristics of the ingredient and/or communicating the characteristics of the ingredient to a remote data processing unit for analyzing or further analyzing the characteristics of the ingredient; and identifying an ingredient type of the ingredient received at the container based on the analysis of the characteristics of the ingredient;

identifying a recipe based on the identified ingredient type; and guiding a user to follow the remainder of the identified recipe.

In an embodiment, identifying the ingredient type comprises applying a machine learning algorithm to the ingredient characteristics.

In a further embodiment, the method further comprises:
obtaining a collaborative machine learning algorithm from a remote data processing resource;
updating the machine learning algorithm based on the collaborative machine learning algorithm.

In a further embodiment, the method further comprises:
obtaining a user input indicating whether the identified recipe has been followed; and
if the user input indicates that the identified recipe has been followed, updating the collaborative machine learning algorithm based one the analyzed characteristics of the ingredient.

In this way, only data corresponding to correctly followed recipes are used to form part of the collaborative machine learning algorithm, thereby increasing the accuracy of the algorithm. For example, a user may be following a certain recipe and after each step may press a "next" button on the user interface of the food processing device. By pressing this "next" button, the user input may implicitly confirm that the ingredient from the previous recipe step has been added, which may then be used for annotating the sensor data.

In an embodiment, the method further comprises suggesting an additional ingredient based on the identified recipe.

According to examples in accordance with an aspect of the invention, there is provided a computer program comprising computer program code means which is adapted, when said computer program is run on a computer, to implement the methods described above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
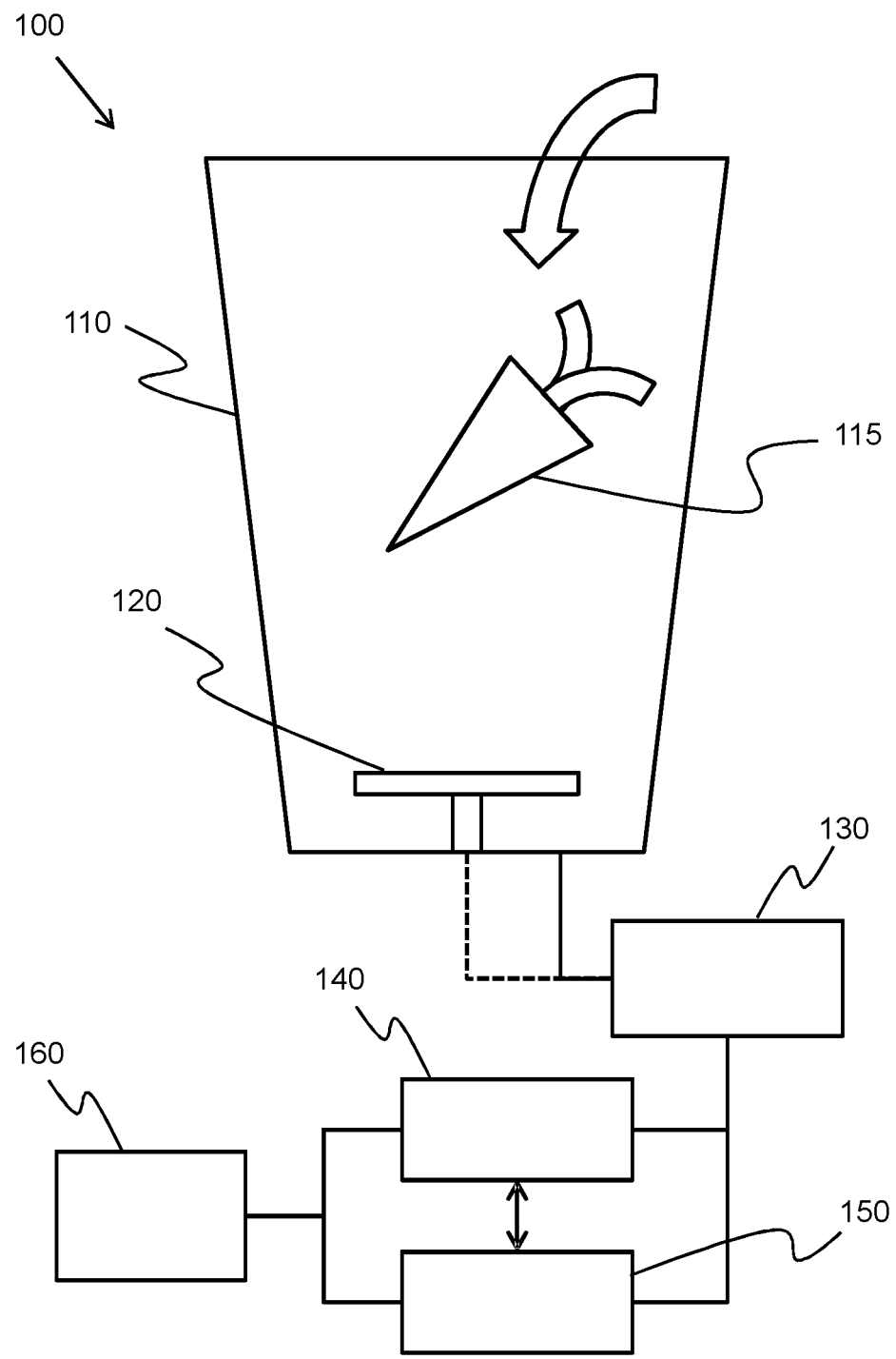
FIG. 1 shows a schematic representation of a food processing device.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a food processing device adapted to identify an ingredient and an associated recipe. The device includes a container for receiving an ingredient to be processed and a blending blade located in the container. The device further includes a sensor for sensing characteristics of the ingredient received at the container and a processor for analyzing the characteristics and/or a communications system for sending the characteristics to a remote data processing resource for analyzing or further analyzing, wherein the analyzing is for identifying ingredient types for a plurality of added ingredients and for identifying a recipe consistent with the added ingredient types. The device further includes an output device for guiding a user to follow the remainder of the identified recipe.

FIG. 1 shows a schematic representation of a food processing device 100 according to an aspect of the invention.

The food processing device 100 includes a container 110 for receiving an ingredient 115 to be processed and a blending blade 120 located within the container.

The food processing device 100 further includes a sensor 130 in communication with the container 110. The sensor is adapted to sense characteristics of the ingredient 115 received at the container.

For example, the sensor may include a weight sensor and the characteristics of the ingredient may include a response curve generated by the weight sensor. A weight sensor, or scale, may be visualized as a spring and the compression or dilation of the spring corresponds with the load placed on the scale. Each time an ingredient is thrown or poured into the container 110 of the food processing device, the scale will not stabilize instantly to the exact weight of the added ingredient but follow a short, up and down, response curve until equilibrium is reached. The weight sensor may also be adapted to measure the pressure, and/or change in pressure, of the ingredients sitting in the container. This is described below with reference to FIG. 2.

Each type of ingredient (such as, fluid, fruit, ice, and the like) affects the scale of the food processing device differently and so generates a different response curve. Hence, the form of the response curve may be used to derive information on the type of ingredient that has been received in the container, which can be used to identify the type of ingredient.

Further, different types of ingredients will have a different response curve, even if they have the same weight. For example, the shape of the response curve of a specific ingredient may depend on: the weight of the ingredient; the elasticity of the ingredient (for example, nuts might bounce back a in the air and fall down again before coming to rest); the shape of the ingredient; the liquidity/viscosity of the ingredient (for example, liquid ingredients can be detected from a specific response curve, however liquids with highly different viscosity levels will also provide a different response, for example water versus oil versus creamy substances like yoghurt or cream); the way it has been thrown or poured in; and ingredients that are already present in the blender.

The response curve for the same ingredient will differ depending on which ingredients where already added beforehand. For example, supposing there is already 200 ml of milk/water in the food processing device, the addition of fruit or nuts will have a completely different response curve than if there was no liquid added to the device beforehand.

By way of example, if the user is following an unknown recipe, the output to the user may take the following form:
 197 g of liquid
 123 g of hard fruit
 166 g of soft fruit
 56 g of ice cubes However, if the recipe is recognized by the device, is known or is manually identified by the user, the above output may be refined as follows:
 197 g of milk
 123 g of hazelnuts
 86 g of banana
 80 g of apple
 56 g of ice cubes The food processing device 100 further includes a processor 140 for analyzing the characteristics and/or a communications system 150 for sending the characteristics to a remote data processing resource for analyzing, or further analyzing, the characteristics of the ingredients.

The analyzing is for identifying ingredient types for a plurality of added ingredients based on the characteristics of the ingredients measured by the sensor 130. Further, the processor, or remote processing resource, identifies a recipe consistent with the added ingredient types. The processor may be adapted to identify the ingredients and the associated recipe by way of a machine learning algorithm trained to recognize ingredients based on the sensed ingredient characteristics. The implementation of such an algorithm is described below with reference to FIG. 4.

The food processing device 100 further includes an output device 160 for guiding a user to follow the remainder of the identified recipe. The output device may, for example, include a display and/or a speaker for communicating with the user.

By way of example, the food processing device may detect that the user has introduced 100 g of strawberries and 100 g of banana into the container. This may be recognized by the processor as the initial ingredients to a smoothie. Accordingly, the output device may indicate to the user that the recipe has been identified as a smoothie. At this point, the user may provide feedback to the food processing device that the identified recipe is indeed correct. The output device may then generate an instruction for how the user should proceed in order to complete the recipe, such as by generating a visual or audible instruction, to instruct the user to add, for example, 200 ml of milk to the container.

The food processing device may be any device adapted to receive one or more ingredients to be processed. For example, the food processing device may be a blender as shown in FIG. 1. In a further example, the food processing device may be a soup maker, in which case the device shown in FIG. 1 may further comprise a heating element for heating the ingredients after they have been processed.

It should be noted that the scale described above may be adapted to only distinguish the type of ingredient received at the container, rather than the exact ingredient itself. The exact ingredient may then be determined from the type of ingredient and the context of a recipe.

The type of ingredient may be identified as one of: a water-like ingredient; an oil-like ingredient; a cream-like ingredient; an egg; a hard fruit; a soft fruit; a vegetable; an ice cube; a pulse; a nut; a meat; and a powder. It should be noted that this list is not exhaustive and any other ingredient type may be utilized by the food processing device for classifying an ingredient.

The weight sensor may be made more accurate and robust by adding multiple weight sensors, such as one at the center of the base of the container and four on the sides, meaning that the device may account for four additional response curves when identifying the ingredient.

Alternatively, or in addition, the sensor may include a camera and the characteristic of the ingredient may include a visual ingredient indicator generated by the camera.

In order to identify the ingredients received at the container 110, the camera may be placed such that it can see what is introduced at the top of the container and have a view that is top down, such that the most recent addition to the container is in view of the camera. In this way, the camera can view every ingredient that is added to the blender. The various implementations of a camera within the food processing unit are discussed below with reference to FIG. 3.

The camera sensor and the weight sensor may be used separately, or be combined to increase the accuracy of the ingredient identification. For example, the camera sensor may be better at detecting which type of ingredient is received in the sensor; whereas, the weight sensor response curve based identification may be better suited to estimating quantities, both in total weight as well as identifying the weight of individual pieces (number of grams per individual piece, piece size and number of pieces).

The piece size information can be used to give feedback to the user (such as, "next time, please cut the banana into smaller pieces") or to automatically adjust the motor settings for the blending blade or select an appropriate blending tool (such as, knife, fork or spoon).

Further, the combination of the weight sensor and the camera sensor may overcome situations where ingredients look visually quite similar (such as, milk and cream) but will result in a different response curve of the weight sensor.

In addition to the weight sensor and the camera sensor, the sensor 130 may comprise additional sensors that may be used in combination with the weight sensor and/or the camera sensor.

For example, the sensor 130 may further include a microphone, in which case the characteristics of the ingredient further comprises an audio signal of the ingredient being received in the container.

In this case, the sound of the ingredient entering the container may be used as part of the ingredient identification process. For example, ice cubes will produce a different audio signal to soft fruit, which will produce a different audio signal to a liquid. Thus, the audio signal may be used to help differentiate ingredients from each other.

The same microphone may be used to detect blending sounds for automatic adaptation of the food processor settings. The microphone may be embedded in a powered bottom part of the food processor, such as a base unit. Alternatively, the microphone is not included in the food processor, but is located in a smart speaker present in the same room (such as the kitchen) and communicatively linked to the food processor by way of a communications system within the food processing device.

Further, the sensor 130 may include a torque sensor coupled to the blending blade 120 of the food processing device, in which case the characteristics of the ingredient comprise a blending resistance.

In other words, additional data points relating to the characteristics of the ingredient may be extracted from a resistance curve of the motor that drives the blending blade 120 of the food processing device. Different ingredients and different ingredient combinations provide a different resistance to the blending blade and so may be used to differentiate ingredients.

Further, the sensor 130 may include an electrical measurement sensor, in which case the characteristics of the ingredient comprise an ingredient impedance.

More specifically, an electrical measurement sensor may be added to the metal blades of the blending blade 120. The bioimpedance spectra of the ingredients in contact with the blending blade may be used to determine the salt and lipid content of the ingredients, which can be used to narrow down the ingredient (for example, cream and milk both look quite alike to a camera but have very different lipid content).

In addition, the sensor 130 may further include a temperature sensor, adapted to determine a temperature of the ingredient, and/or a gas sensor, adapted to analyze the air within the container in order to identify the ingredient.

Figure 2:
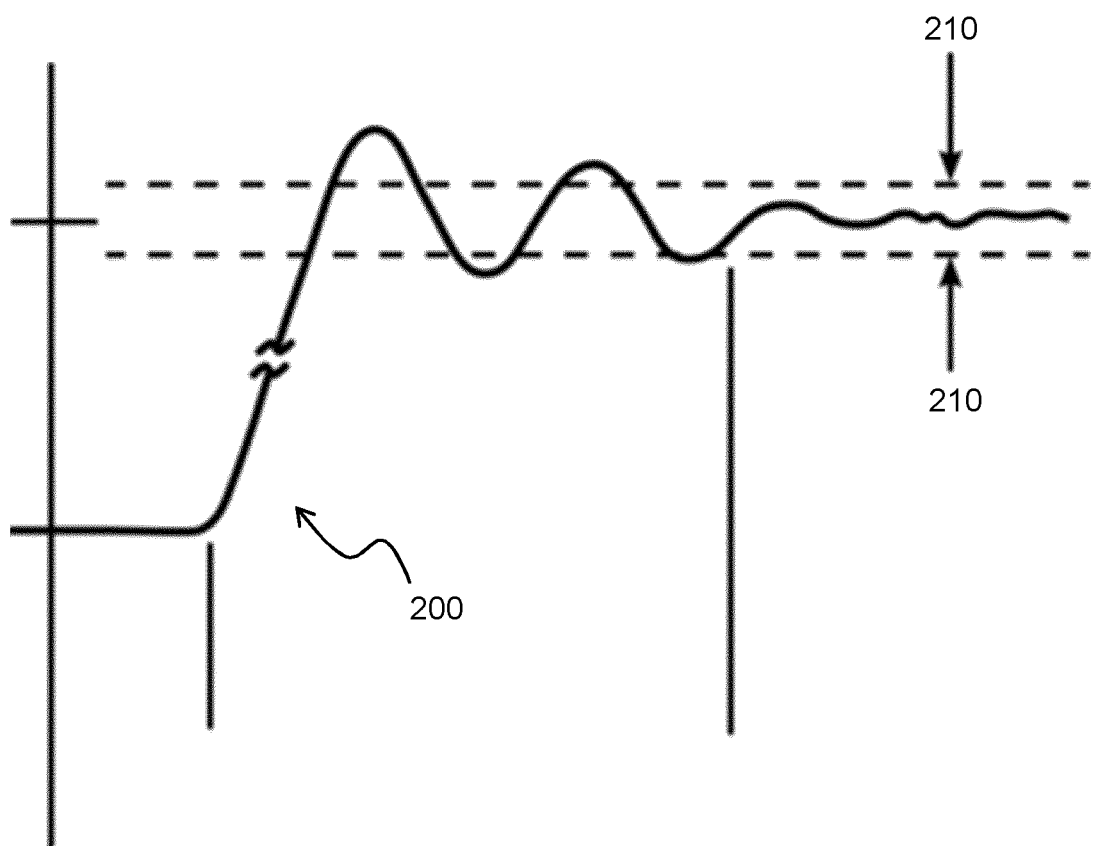
FIG. 2 shows an example plot of a response curve generated by a weight sensor upon receiving an ingredient in a container.

FIG. 2 shows an example plot of a response curve 200 generated by a weight sensor upon receiving an ingredient in a container, wherein the x-axis represents time and the y-axis represents detected weight.

As can be seen from the response curve, there is an initial sharp increase in weight at time when an ingredient is received at the container. The weight measurement then oscillates until the reading has settled between error bars 210, at which point, a typical digital scale would give a reading. However, the processor 140, or remote data processing resource, may analyze the entire response curve in order to identify the received ingredient.

Figure 3A:
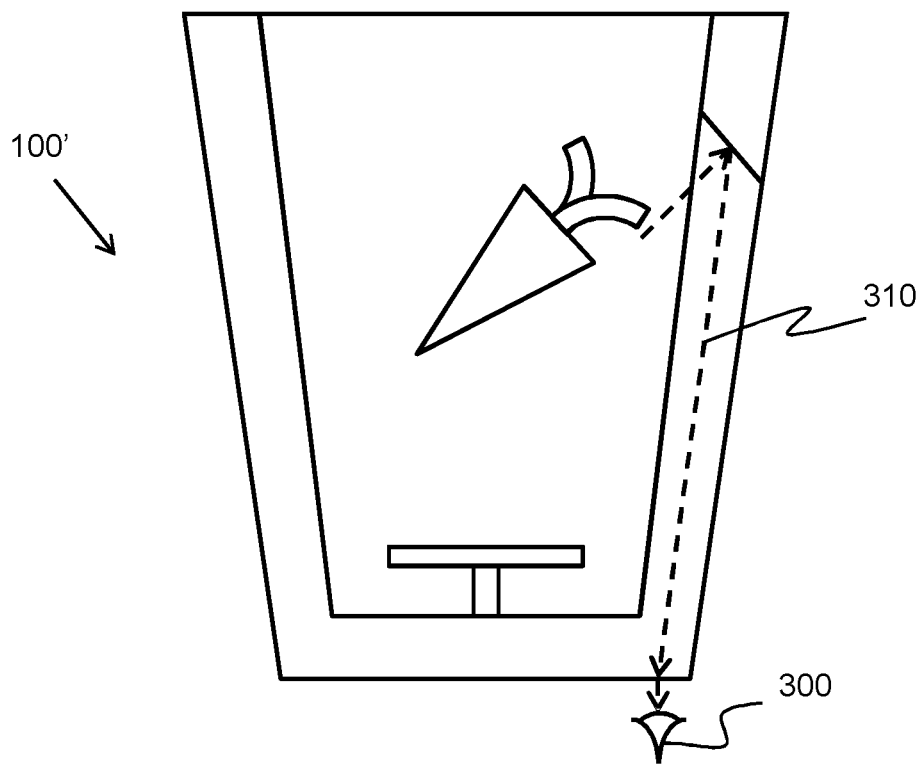
FIGS. 3a and 3b show schematic representations of an embodiment of the food processing device of FIG. 1.
Figure 3B:
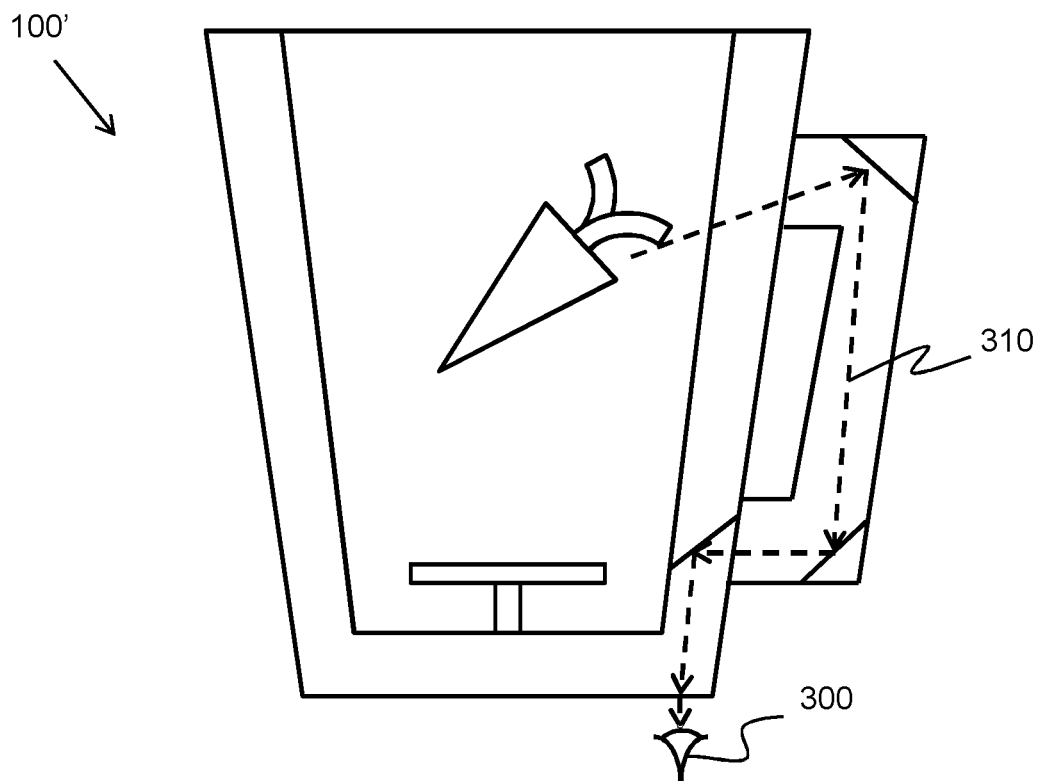

FIGS. 3a and 3b show schematic representations of an embodiment of the food processing device 100' comprising a camera sensor 300 and a light guide 310.

The simplest implementation of a camera capable of capturing such a view would be to house the camera in a lid for the container, such that the camera would have a top down view of the ingredients within the container.

In blenders with a large form factor, it is relatively straightforward to add a camera that is placed on top of the lid to an electrical power source and a computational processing unit. While the top lid is open, a camera placed on this top lid can capture visually what is added to the container. When the lid is closed the camera may be protected by a cover that fits tightly to the top of the container.

However, most blenders designed for home use will have a different, and more specifically a smaller, form factor. In blenders with this smaller form factor, while not impossible, it is not straightforward to locate a camera on the lid of the container as the camera needs to be connected to a power source and a processing unit. Placing these parts in the container or the lid has the additional complication that these parts need to be dishwasher-proof and hence need to be resistant to a high temperatures and wet environments.

This problem may be solved by locating the camera in a base unit that is removably coupled to the container, meaning that the container may be removed for cleaning without the camera.

However, simply locating the camera in the base unit below the container would result in the camera only being able to capture the ingredients first added to the container, after which its view would be blocked.

FIG. 3a shows a solution to this problem, wherein the camera 300 is in communication with a light guide 310 housed within a wall of the container.

This light guide system, or periscope system, can transmit the light coming from the top of the container to the bottom of the container into the camera. In this way, the camera can still register which ingredients are being added to the container without being blocked.

FIG. 3b shows an example where the light guide is located within a handle 315 of the container. The handle can be made non-transparent in such a way that no external light can enter the camera.

It should be noted that any of the sensors described above may be located in the base unit of the food processing device and connected to the container by any suitable means. For example, the weight sensor may be located in the base sensor and be adapted to measure the weight of the container and the ingredient, from which the weight of the container may be subtracted. In a further example, the electrical measurement sensor may be located in the base unit and electrically coupled to the blending blade blades via a conductive, mechanical coupling unit in the base unit.

Figure 4:
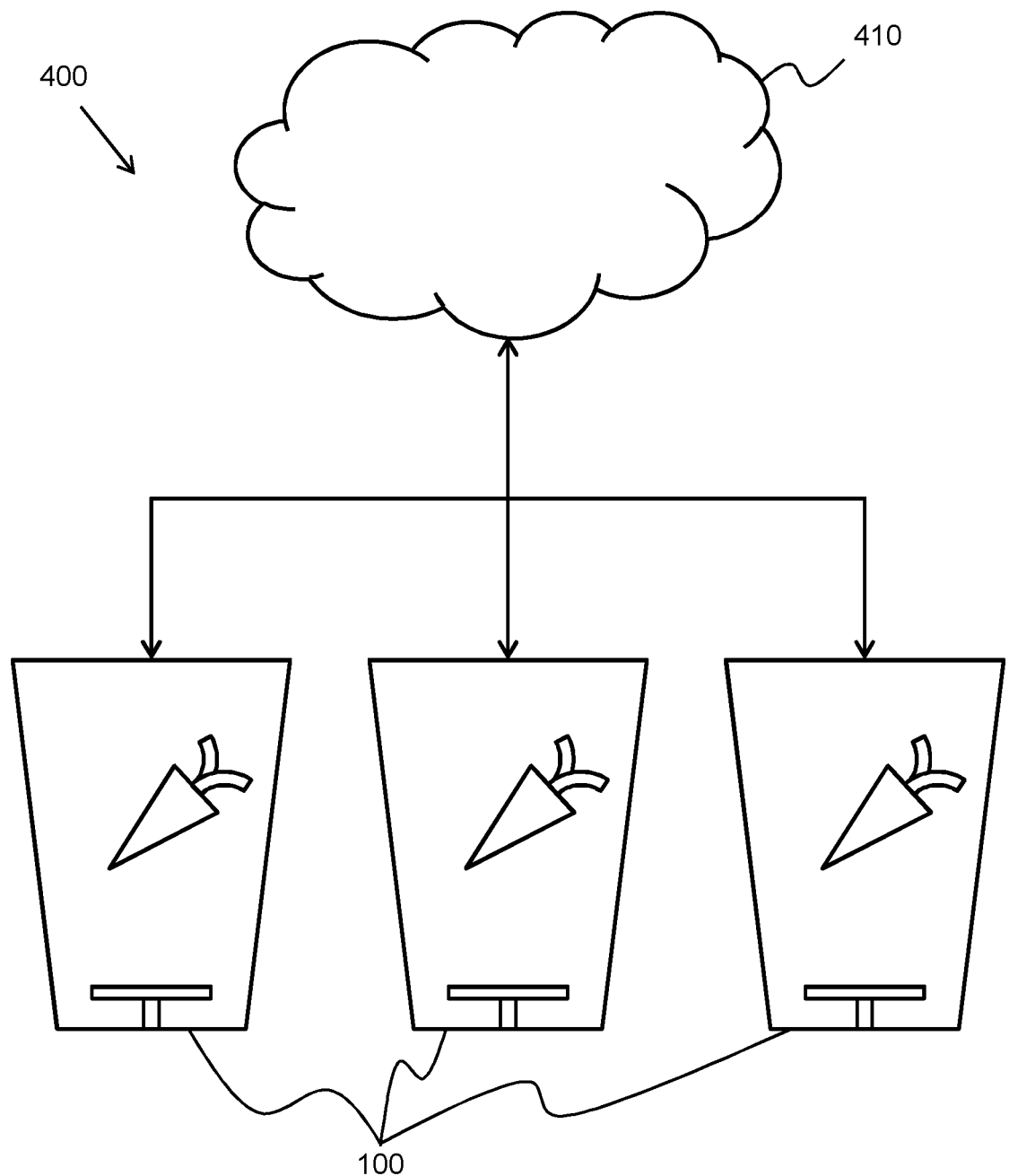
FIG. 4 shows a schematic representation of a system for guiding a user according to a recipe identified based on an identified ingredient.

FIG. 4 shows a schematic representation of a system 400 for guiding a user according to a recipe identified based on an identified ingredient.

The system includes one or more food processing devices 100 as described above and a remote data processing resource 410 coupled to the food processing devices by way of the communications system 150.

The remote data processing resource comprises a collaborative machine learning algorithm. A collaborative machine learning algorithm is a machine learning algorithm that combines the training data of different blenders, each of which may have an onboard machine learning algorithm, and combines them into one trained algorithm.

In this way, the system may be adapted to update the machine learning algorithm of the one or more food processing devices based on the collaborative machine learning algorithm and upload the analyzed characteristics of the ingredient from the one or more food processing devices to the remote data processing resource for use in training the collaborative machine learning algorithm.

The one or more food processing devices 100 may communicate with the remote data processing resource 410 by way of a user's smart device connected to the communications system 150 of each food processing device.

Every time a user follows a recipe a number of labeled training data points may be provided to the collaborative machine learning algorithm. For example, if the recipe indicates that the user has to add 50 grams of strawberries, the subsequent response curve of the scale provides a labeled data point. These labeled data points can be measured and uploaded to the remote data processing resource.

All labeled data points from the one or more food processing devices may be combined to provide a large labeled dataset that can be used to train the collaborative machine learning algorithm that can detect ingredients from the response curve and any other sensor signal associated with the characteristics of the ingredient.

To train an algorithm to learn the response curves of different ingredients, the following approach may be followed.

Every time a user follows a recipe, a collection of labeled response curves is generated (one response curve for each separate ingredient added). This stage may also include any other sensor signal associated with the characteristics of the ingredients. This list of labeled response curves is sent to a backend server, or remote data processing resource. In this way, a large amount of labeled training data is generated. On the backend server a collaborative machine learning algorithm is trained to identify types of ingredients from the labeled response curves. A neural network may be used for this. This trained algorithm is then re-distributed to the food processing devices.

The collaborative machine learning algorithm relies on a user following the order of the recipe to obtain an accurate dataset. Before starting the blending process, the user may be prompted to confirm whether they have followed the recipe order. If they do not confirm that the recipe order has been follow, the data from this session can be excluded for the collaborative learning process.

It should be noted that the training of the collaborative machine learning algorithm described above can deal with strongly distorted images, in the case where the sensor includes a camera, as long as the distortion does not lose too much information and as long as the distortion is the same, or similar, in different blenders and blender models so that it may be accounted for in the training of the collaborative algorithm. In some cases, only object color information may be sufficient to differentiate between the various ingredients used in a recipe.

Figure 5:
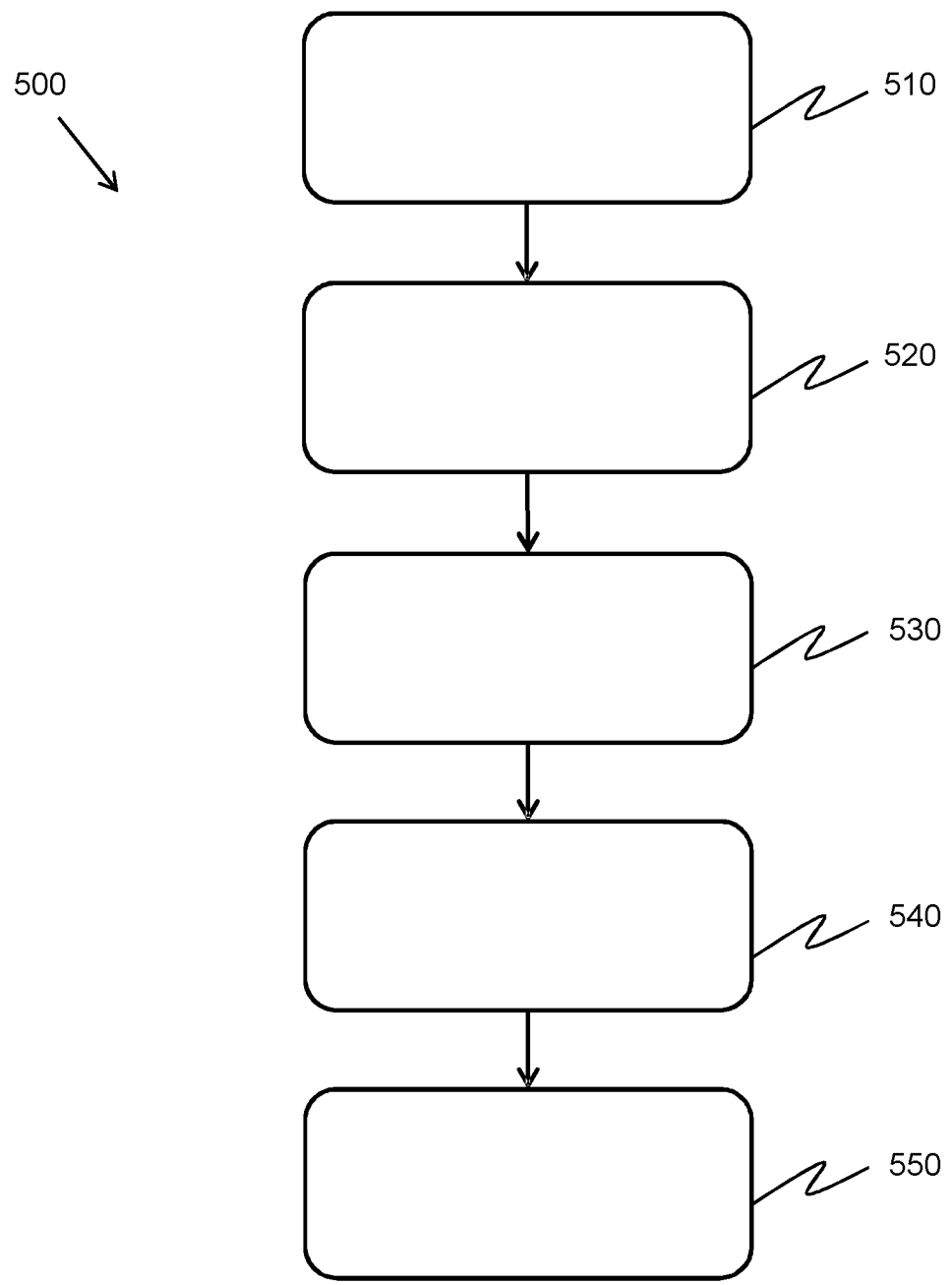
FIG. 5 shows a recipe guiding method.

FIG. 5 shows a recipe guiding method 500.

The method begins in step 510 by sensing characteristics of an ingredient when the ingredient is received in a container. The characteristics of the ingredient may be sensed using any suitable sensing means, such as those described above.

In step 520, the characteristics of the ingredient are analyzed and/or communicated a remote data processing unit for analyzing, or further analyzing.

In step 530, an ingredient type of the ingredient received at the container is identified based on the analysis of the characteristics of the ingredient.

The steps of analyzing and identifying the ingredient type may be performed using the algorithms discussed above.

In step 540, a recipe is identified based on the identified ingredient type. The recipe may be identified in a similar manner to the identification of the ingredient types. In other words, the recipe may be identified by applying a machine learning algorithm, which may be collaboratively trained, to the identified ingredients.

The recipe may be identified automatically, or may provide a suggested recipe to the user based on the identified ingredient, who may then confirm that the suggested recipe is correct. Further, a list of suggested recipes may be presented to the user, who may then select the desired recipe from the list.

A number of recipes may be known by the system; however, the user may add new recipes to the known recipes.

In step 550, the user is guided to follow the remainder of the identified recipe. The guidance may be adjusted based on the ingredients already present within the container.

In addition, the recipe guidance may include suggesting an additional ingredient based on the identified recipe. For example, a given recipe may include a number of known variations, where some variations include alternative ingredients. In this way, the tastes of the user may be assessed based on commonly used recipes and used to select a variation that aligns with the user's tastes. This may also be utilized to circumvent an ingredient that the user is allergic to. For example, the user may select a nut-free preference in the recipe guidance settings, which may then be used to provide recipe variations that do not contain the indicated ingredients, such as nuts.

In summary, the invention provides for a device, system and method for identifying an ingredient received at a container of a food processing device and providing a user with recipe guidance based on the identified ingredients.

It should be noted that the user may not always follow the recipe step by step according to the provided guidance. By automatically detecting the ingredient type when received at the container, it is possible to handle different recipe orders followed by the user. Further, a user may have a set of favorite recipes that they regularly make. Automatic detection of the recipe may be used to help track the nutritional intake of the user and provide suggestions for new recipes or suggestions for altering their common recipes to improve their nutritional value.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. If a computer program is discussed above, it may be stored/distributed on a suitable medium, such as an optical storage medium or a solid-state medium supplied together with or as part of other hardware, but may also be distributed in other forms, such as via the Internet or other wired or wireless telecommunication systems. If the term "adapted to" is used in the claims or description, it is noted the term "adapted to" is intended to be equivalent to the term "configured to". Any reference signs in the claims should not be construed as limiting the scope.

The invention claimed is:

1. A food processing device, comprising:
 a container to receive an ingredient to be processed;
 a blending blade located in the container;
 a sensor to sense characteristics of the ingredient received at the container;
 a processor to analyze the characteristics;
 a communications system to send the characteristics to a remote data processing resource to analyze the characteristics to identify ingredient types for a plurality of added ingredients and to identify a recipe consistent with the added ingredient types; and
 an output device to guide a user to follow a remainder of the identified recipe, wherein the sensor comprises a weight sensor,
  wherein the characteristics of the ingredient comprise a response curve generated by the weight sensor, wherein the response curve represents a weight detected by the weight sensor over time from receiving the ingredient at the container until equilibrium in the detected weight is reached, wherein the response curve includes oscillations in the detected weight of the ingredient between receiving the ingredient at the container and the equilibrium in the detected weight being reached, and wherein identification of the ingredient types comprises analyzation of the oscillations in the detected weight of the ingredient.

2. The food processing device as claimed in claim 1, wherein the sensor further comprises a camera, and wherein the characteristics of the ingredient comprise a visual ingredient indicator generated by the camera.

3. The food processing device as claimed in claim 2, further comprising:
   a base unit adapted to be removably coupled to the container, wherein the camera is located within the base unit; and
   a light guide adapted to direct light from an upper portion of the container to the camera.

4. The food processing device as claimed in claim 3, wherein the container comprises a handle, and wherein at least a portion of the light guide is located within the handle.

5. The food processing device as claimed in claim 1, wherein the sensor further comprises one or more of:
   a microphone, wherein the characteristics of the ingredient comprise an audio signal of the ingredient being received in the container;
   a torque sensor coupled to the blending blade, wherein the characteristics of the ingredient comprise a blending resistance;
   an electrical measurement sensor, wherein the characteristics of the ingredient comprise an ingredient impedance;
   a temperature sensor, wherein the characteristics of the ingredient comprise a temperature of the ingredient; and
   a gas sensor, wherein the characteristics of the ingredient comprise a gas composition of air within the container.

6. The food processing device as claimed in claim 1, wherein the communications system is adapted to be in communication with a smart device of the user.

7. The food processing device as claimed in claim 1, wherein the processor is adapted to apply a machine learning algorithm to the characteristics of the ingredient for analyzing said characteristics of the ingredient.

8. The food processing device as claimed in claim 1, wherein the response curve is based on at least one of: the detected weight of the ingredient, elasticity of the ingredient, a shape of the ingredient, viscosity of the ingredient, and ingredients already present in the container.

9. A system for guiding a user according to a recipe identified based on an identified ingredient, the system comprising:
   one or more food processing devices as claimed in claim 7;
   a remote data processing resource coupled to the one or more food processing devices by way of the communications system, the remote data processing resource comprising a collaborative machine learning algorithm, wherein the system is adapted to:
   update the machine learning algorithm of the one or more food processing devices based on the collaborative machine learning algorithm; and
   upload the analyzed characteristics of the ingredient from the one or more food processing devices to the remote data processing resource for use in the collaborative machine learning algorithm.

10. A recipe guiding method, comprising:
    sensing characteristics of an ingredient when the ingredient is received in a container, the characteristics of the ingredient comprising a response curve generated by a weight sensor;
    analyzing the characteristics of the ingredient and communicating the characteristics of the ingredient to a remote data processing unit for further analyzing the characteristics of the ingredient;
    identifying an ingredient type of the ingredient received at the container based on the analysis of the characteristics of the ingredient;
    identifying a recipe based on the identified ingredient type; and
    guiding a user to follow a remainder of the identified recipe,
       wherein the response curve represents a weight detected by the weight sensor over time from receiving the ingredient at the container until equilibrium in the detected weight is reached, wherein the response curve includes oscillations in the detected weight of the ingredient between receiving the ingredient at the container and the equilibrium in the detected weight being reached, and wherein identifying the ingredient type comprises analyzing the oscillations in the detected weight of the ingredient.

11. The method as claimed in claim 10, wherein identifying the ingredient type further comprises applying a machine learning algorithm to the ingredient characteristics.

12. The method as claimed in claim 11, wherein the method further comprises:
    obtaining a collaborative machine learning algorithm from a remote data processing resource; and
    updating the machine learning algorithm based on the collaborative machine learning algorithm.

13. The method as claimed in claim 12, wherein the method further comprises:
    obtaining a user input indicating whether the identified recipe has been followed; and
    if the user input indicates that the identified recipe has been followed, updating the collaborative machine learning algorithm based on the analyzed characteristics of the ingredient.

14. The method as claimed in claim 10, wherein the method further comprises suggesting an additional ingredient based on the identified recipe.

15. The method as claimed in claim 10, wherein the response curve is based on at least one of: the detected weight of the ingredient, elasticity of the ingredient, a shape of the ingredient, viscosity of the ingredient, and ingredients already present in the container.

16. A non-transitory computer readable recording medium storing a computer program comprising computer program code means which is adapted, when said computer program is run on a computer, to implement the steps of:
    obtaining sensed characteristics of an ingredient when the ingredient is received in a container, the characteristics of the ingredient comprising a response curve generated by a weight sensor;
    analyzing the characteristics of the ingredient and communicating the characteristics of the ingredient to a remote data processing unit for further analyzing the characteristics of the ingredient;

identifying an ingredient type of the ingredient received at the container based on the analysis of the characteristics of the ingredient;

identifying a recipe based on the identified ingredient type; and generating guidance for a user to follow a remainder of the identified recipe, wherein the response curve represents a weight detected by the weight sensor over time from receiving the ingredient at the container until equilibrium in the detected weight is reached, wherein the response curve includes oscillations in the detected weight of the ingredient between receiving the ingredient at the container and the equilibrium in the detected weight being reached, and wherein identifying the ingredient type comprises analyzing the oscillations in the detected weight of the ingredient.

* * * * *